United States Patent
Lundgren (10) Patent No.: US 9,162,629 B2
(45) Date of Patent: Oct. 20, 2015

(54) EXTENDABLE VEHICLE RACK ARRANGEMENT

(75) Inventor: Anders Lundgren, Grimsås (SE)

(73) Assignee: THULE SWEDEN AB, Hillerstorp (SE)

(*) Notice: Subject to any disclaimer, the term of this patent is extended or adjusted under 35 U.S.C. 154(b) by 159 days.

(21) Appl. No.: 13/643,711

(22) PCT Filed: Apr. 20, 2011

(86) PCT No.: PCT/EP2011/056340
§ 371 (c)(1),
(2), (4) Date: Jan. 29, 2013

(87) PCT Pub. No.: WO2011/134868
PCT Pub. Date: Nov. 3, 2011

(65) Prior Publication Data
US 2013/0206802 A1  Aug. 15, 2013

(30) Foreign Application Priority Data
Apr. 27, 2010  (EP) .................................. 10161145

(51) Int. Cl.
*B60R 9/045* (2006.01)
*B60R 9/042* (2006.01)

(52) U.S. Cl.
CPC ................ *B60R 9/045* (2013.01); *B60R 9/042* (2013.01)

(58) Field of Classification Search
CPC .......... B60R 9/045; B60R 9/04; B60R 9/042; B60R 9/08; B60R 9/052; B60R 9/058
USPC ......... 224/320, 310, 309, 321, 322, 325, 326; 414/462
See application file for complete search history.

(56) References Cited

U.S. PATENT DOCUMENTS 5,421,495 A * 6/1995 Bubik et al. .................. 224/310
5,782,391 A    7/1998 Cretcher
5,884,824 A * 3/1999 Spring, Jr. .................... 224/310

(Continued)

FOREIGN PATENT DOCUMENTS

AU  2003231667 A1  2/2004
EP       0433495 A1  6/1991

(Continued)

OTHER PUBLICATIONS

International Searching Authority, International Search Report for International Application No. PCT/EP2011/056340, dated Sep. 2, 2011.

*Primary Examiner* — Adam Waggenspack
*Assistant Examiner* — Matthew Theis
(74) *Attorney, Agent, or Firm* — Novak Druce Connolly Bove + Quigg LLP (57) ABSTRACT

The present invention relates to an extendable vehicle rack arrangement (10) comprising a first and a second load carrier foot (3, 4) and comprising a stationary part (12) attached to said first and second load carrier foot (3, 4) and a displaceable part (11). The stationary part (12) is pivotally connected to at least one of the load carrier feet (3, 4). The extendable vehicle rack arrangement (10) is advantageously an extendable vehicle top rack arrangement. The present invention provides for a solution which effectively reduces or neutralizes the intrinsic forces which can be imparted to an extendable vehicle rack arrangement during or after attachment to a vehicle, thereby providing an easier extension of the displaceable part (11).

19 Claims, 5 Drawing Sheets

(56) References Cited

U.S. PATENT DOCUMENTS

| | | | |
|---|---|---|---|
| 5,931,359 A * | 8/1999 | Zona | 224/321 |
| 5,988,470 A | 11/1999 | Siciliano | |
| 6,428,263 B1 * | 8/2002 | Schellens | 414/462 |
| 6,457,617 B1 * | 10/2002 | Andersson | 224/329 |
| 2007/0039985 A1 | 2/2007 | Warren et al. | |

FOREIGN PATENT DOCUMENTS

| | | |
|---|---|---|
| WO | 2005044618 A2 | 5/2005 |
| WO | 2011134868 A1 | 11/2011 |

* cited by examiner

EXTENDABLE VEHICLE RACK ARRANGEMENT

CROSS-REFERENCE TO RELATED APPLICATIONS

This application is a national phase application of international application no. PCT/EP2011/056340 which has an international filing date of Apr. 20, 2011 and which claims priority to EP application no. 10161145.7, filed Apr. 27, 2010, both of which are entirely incorporated by reference herein.

TECHNICAL FIELD

The present invention relates to an extendable vehicle rack arrangement having a stationary part and a displaceable part. The stationary part is pivotally connected to at least one of the load carrier feet.

BACKGROUND OF THE INVENTION

Car top rack systems, or roof rack arrangements, can be of the static type, having no movable parts, or of the slideable type, having an extendable load carrying surface. An extendable roof rack arrangement is disclosed in the published patent application WO 2005/44618, which discloses an extendable cross bar system. The extendable cross bar system comprises a stationary portion and an extendable portion. A sliding low friction pad is arranged between the stationary portion and the extendable portion to reduce the friction between these portions.

Another vehicle roof rack system is disclosed in the patent publication AU 2003231667 A1. This document discloses a solution which incorporates an inner and outer member, the inner member being slideable to an extended position. The vehicle roof rack system comprises a special end section to provide a neat end cap for the aperture formed by the outer member. Both these documents are silent about the problems which arise when using slideable members in roof rack systems. The documents are further silent about the problems which can arise from the intrinsic forces imparted to the roof rack system e.g. from the load carrier feet.

Generally there are two different types of load carrier feet used in roof rack systems; clamp rack feet (including rack feets for rails) and fix point feet. A load carrier foot which uses a clamping force imparted between a support surface and a gripping member as primary attachment force is generally of the clamp rack type, and a load carrier foot which are cooperating with pre prepared positions on the vehicle, is generally of a fix point foot.

During attachment of a clamp rack load carrier foot to the roof of the vehicle, the clamp rack load carrier foot rests on the roof and a grip member engages a ledge on the vehicle. The grip member is thereafter forced in an upwardly by means of attachment means, such as a screw. The attachment means imparts a clamping force between the support surface and the grip member which retains the clamp rack load carrier foot to the roof of the vehicle. A problem with a clamp rack load carrier foot of this type is that this force also imparts the clamp rack load carrier foot with a force component which acts to rotate the clamp rack load carrier foot towards the roof of the vehicle, i.e. each clamp rack load carrier foot tend to force themselves towards each other during attachment. As a consequence, intrinsic forces are formed within the load carrying bar. This could manifest itself by that the stationary part of the roof rack system bends, i.e. forms an arc shape along its length. Such intrinsic forces severely affect the performance of an extendable roof rack system as the extendable part can stick on the arc shaped stationary part. Intrinsic forces imparted via the clamp rack load carrier foot could also arise from misaligned load carrier feet or a wrongly positioned or assembled load carrier foot.

SUMMARY OF THE INVENTION

It is an object of the present invention to partly solve the above mentioned drawbacks, to provide a useful alternative to the above mentioned solutions or to at least reduce the impact of the above mentioned drawbacks. More specifically, this object is met by an extendable vehicle rack arrangement adapted to be attached to a vehicle. The extendable vehicle rack arrangement enables a displacement of a load carrying surface and comprises a first displaceable load carrying bar comprising a first load carrying surface, a second bar arranged in working cooperation with the displaceable load carrying bar. A first and a second load carrier foot are attached to the second bar. The displaceable load carrying bar is displaceable with respect to the second bar so as to provide for an extended or displaced load carrying surface after displacement. The second bar is pivotally attached, directly or indirectly, to at least the first load carrier foot, so as to enable a relative displacement of at least the first load carrier foot with respect to the second bar.

The present invention effectively neutralises, or at least reduces, intrinsic forces which can arise in the extendable vehicle rack arrangement during or after attachment to the vehicle. Such intrinsic forces could also arise if cargo is displaced or unevenly positioned on the extendable vehicle rack arrangement. By reducing the intrinsic forces, the risk of damage to the vehicle, such as deformation of parts of the vehicle body, nr the risk of stressing the components of the extendable vehicle rack arrangement can be reduced or removed.

It has been found to be advantageous if the second bar is pivotally attached, directly or indirectly, to the first and second load carrier foot, so as to enable a relative displacement of the first and second load carrier feet with respect to the second bar. This enables in improved stress and intrinsic force reducing properties.

According to an aspect of the invention, the second bar has a longitudinal axis, and the first load carrier foot is relatively displaceable in a direction along the first longitudinal axis. This provides a compensation joint between the load carrier foot and the second bar. Both the first and the second load carrier foot can comprise a compensation joint which permits a pivotally displacement and a longitudinal displacement of the second bar with respect to the load carrier feet.

According to an aspect of the invention, the second bar can comprise a load carrying surface. In this embodiment, the second bar is specifically adapted for receiving a load. The first load carrying surface can be displaceable in both a first and a second longitudinal direction. Optionally the second bar is not configured to receive and carry a load, in which the extendable vehicle rack arrangement comprises a constant load carrying surface, although being displaceable. One advantage of having a constant load carrying surface is that the displaceable load carrying bar can be adapted to extend across substantially the whole length of the extendable vehicle rack arrangement, further enabling the first load carrying surface to be easily reachable and displaceable in a first and a second longitudinal direction. This enables a user to displace the displaceable load carrying bar on either side of the vehicle if desirable.

According to an aspect of the invention, the extendable vehicle rack arrangement comprises at least one support bar. The at least one support bar extends between the first and second load carrier foot and provide rigidity to the first and the second load carrier foot and is substantially fixedly attached thereto. The support bar is at least substantially fixedly attached to the first and the second load carrier foot, at least when the first and the second load carrier foot is in the mounted position, as defined herein.

In the embodiments having at least one support bar, the second bar is advantageously pivotally attached to the at least one support bar, so as to enable a relative displacement of the first load carrier foot, or the first and the second load carrier foot, with respect to the second bar. Optionally, the second bar can still be pivotally attached to the first and/or second load carrier foot, while still having a support bar there between.

The support bar can be configured to receive and carry a load. In an embodiment, the support bar thus comprises a load carrying surface. This has been found to be advantageous if an extended load carrying surface is desired as it reduces the wear on the second bar, and any additional bar if present.

According to an aspect of the invention, the displaceable load carrying bar can be arranged in working cooperation with an additional bar, similar to the second bar. The additional bar can be adapted to extend substantially parallel with the second bar. The displaceable load carrying bar can be readily supported by the second and additional bar, preventing a rotational motion of the displaceable load carrying bar around the longitudinal axis of the displaceable load carrying bar. The second and the additional bar can both be pivotally attached, or be connected via a compensation joint, to the first and the second load carrier foot, or optionally if present, to a support bar extending between the first and the second load carrier foot.

In an embodiment, at least one support bar can be arranged between the second and the additional bar. In this case the extendable vehicle rack arrangement comprises a support bar, the additional bar is then referred to as the forth bar, i.e. the additional forth bar. The second and forth bars can be pivotally attached to the at least one support bar to enable a relative displacement of at least the first load carrier foot with respect to said second bar or advantageously to both the first and the second load carrier foot.

The extendable vehicle rack arrangement is advantageously used when the first and second load carrier foot are of the clamping type load carrier foot having a support surface and a gripping member.

In general terms, the present invention relates to an extendable vehicle rack arrangement comprising a first and a second load carrier foot and comprising a stationary part attached to said first and second load carrier foot and a displaceable part. The stationary part is pivotally connected to at least one of the load carrier feet. The extendable vehicle rack arrangement is advantageously an extendable vehicle top rack arrangement, even more advantageously an extendable roof rack arrangement.

According to an aspect of the invention, the invention relates to an extendable load carrying bar arrangement for an extendable vehicle rack arrangement comprising a first displaceable load carrying bar comprising a first load carrying surface, at least a second bar arranged in working cooperation with the displaceable load carrying bar. The displaceable load carrying bar is displaceable with respect to the second bar so as to provide for an extended or displaced load carrying surface after displacement. The load carrying bar arrangement comprises means for connecting a first and a second load carrier foot at a first and second connection site. The first and second load carrier foot is operable between a dismounted position and a mounted position. At least the first connection site is adapted to connect to the first load carrier foot by means of a pivot connection so as to enable a relative displacement of at least the first load carrier foot with respect to the second bar after assembly and when being in the mounted position.

The load carrying bar arrangement can be connected to a load carrier foot and can be sold separately from the load carrier feet if desired.

The extendable load carrying bar arrangement can comprise an additional bar extending substantially parallel with the second bar. Using one or more addition bars, a more rigid construction is achieved. The at least one support bar can be arranged between the second and the additional bar advantageously.

According to an aspect of the invention, the invention relates to a load carrier foot for an extendable vehicle rack arrangement. The load carrier foot is adapted to be attached to a surface of a vehicle. The load carrier foot comprises a connection site for receiving and connecting to an extendable load carrying bar arrangement to thereby form an extendable vehicle rack arrangement. The load carrier foot being operable between a dismounted position and a mounted position. The load carrier foot is further adapted to connect to the extendable load carrying bar arrangement by means of a pivot connection so as to enable a relative displacement of the load carrier foot with respect to the second bar after assembly and when being in the mounted position.

The load carrier foot can be connected to a load carrying bar arrangement and can be sold separately from the load carrying bar arrangement if desired.

The load carrier foot is advantageously of a clamping type load carrier foot having a support surface and a gripping member.

BRIEF DESCRIPTION OF THE DRAWINGS

The present invention will be described in greater detail with reference to the accompanying figures in which.

DETAILED DESCRIPTION OF PREFERRED EMBODIMENTS

Figure 1:
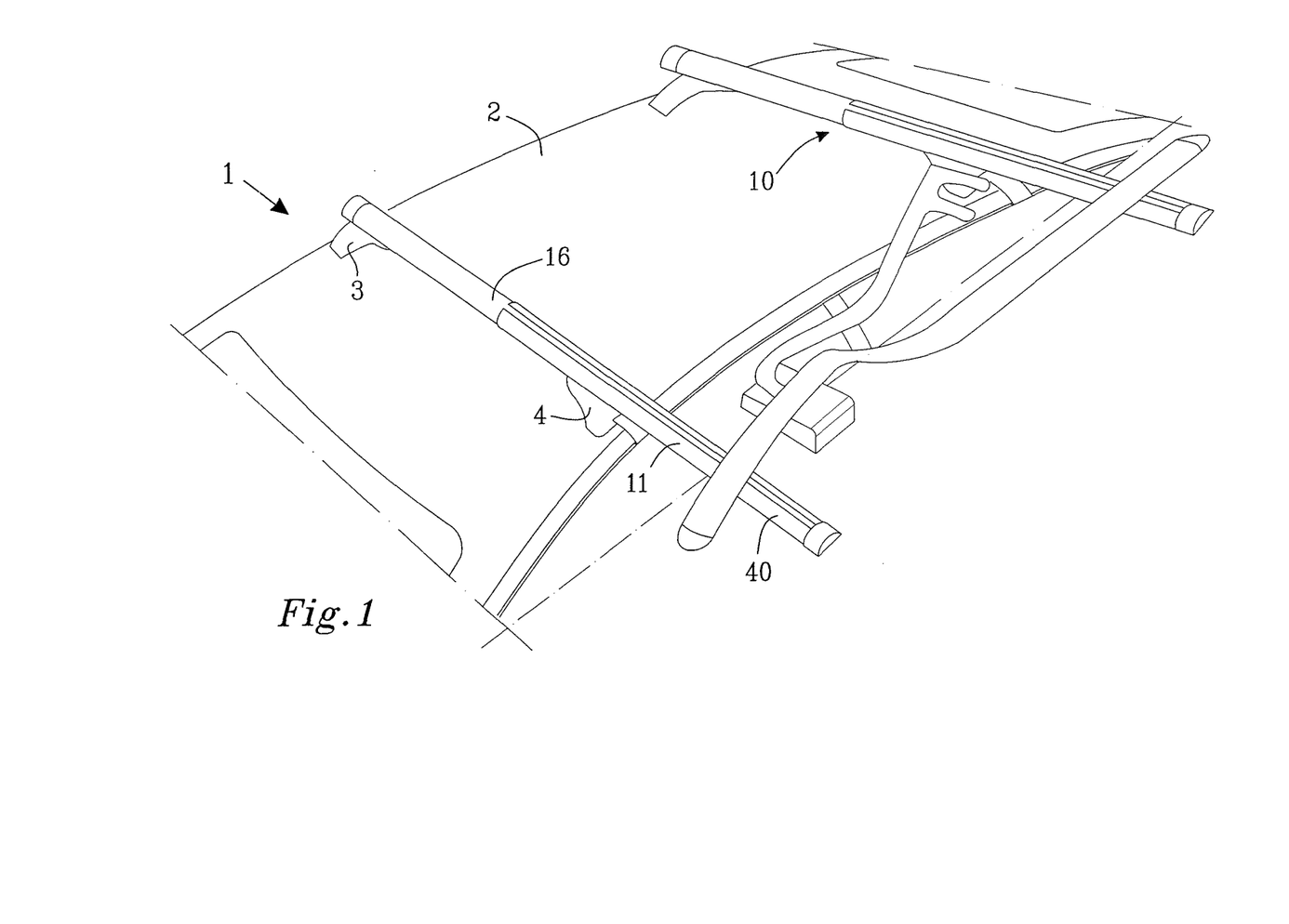
FIG. 1 shows a schematic view of two extendable vehicle rack arrangements according to the present invention in their extended positions and attached to a vehicle.

FIG. 1 shows, from above and in perspective, a vehicle 1 having a roof 2. Two extendable roof rack arrangements 10 are attached to the roof 2. One of the extendable roof rack arrangements 10 can be used in combination with a standard roof rack arrangement or optionally, as shown in FIG. 1, two extendable roof rack arrangements 10 can be used. The extendable roof rack arrangement 10 enables a user to displace a displaceable load carrying bar 11 from a retracted position to a displaced position. In the displaced position, a user can easily place the cargo on the displaceable load carrying bar 11 and thereafter retract the displaceable load carrying bar 11 to its retracted position. FIG. 1 shows how the two roof rack arrangements 10 are positioned in their displaced position and a cycle carrier rack 12 has been placed on the displaceable load carrying bars 11 of the roof rack arrangements 10.

As mentioned, the displaceable load carrying bar 11 is operable between a retracted position and a displaced position. When the displaceable load carrying bar 11 is in the retracted position, the extendable roof rack arrangement 10 has a retracted load carrying surface, adapted to receive and carry a load.

According to an aspect of the present invention, the retracted load carrying surface is the load carrying surface which the extendable roof rack arrangement is intended to have when the vehicle is used, i.e. during transporting. If however the roof rack arrangement 10 is provided with a load carrying bar lock, the roof rack arrangement 10 can be used during transporting even when the load carrying bar 11 is in the displaced position.

The displaceable load carrying bar 11 comprises a load carrying surface 40 which is adapted to receive the load. When the displaceable load carrying bar 11 is in its displaced position, the extendable roof rack arrangement 10 has a displaced load carrying surface. In this embodiment, the load carrying surface is substantially constant in the retracted position and in the displaced position. According to an aspect of the invention, the load carrying surface can be increased when the displaceable load carrying bar 11 is in its displaced position.

The displaced position can be a plurality of different positions enabling a step wise displacement or increase of the load carrying surface, or optionally a continuous displacement or increase of the load carrying surface. The load carrying bar 11 can be positioned at a minimum displaced position and a maximum displaced position. Between the minimum displaced position and a maximum displaced position, there can be a plurality of positions or an infinite number of positions for the displaceable load carrying bar.

The extendable roof rack arrangement 10 is attached to the roof 2 of the vehicle 1 using a first and a second load carrier foot 3, 4. It is of course possible that the extendable roof rack arrangement 10 can be attached to the cargo area of a vehicle, such as the rear cargo compartment or a loading platform of a vehicle. The first and the second load carrier feet 3, 4 are adapted to be positioned between a dismounted position and a mounted position. In the mounted position, said extendable roof rack arrangement 10 is fixed to the vehicle 1 with at least a sufficient force to drive the vehicle under normal circumstances without risking that the extendable roof rack arrangement 10 comes off. When the first and second load carrier foot 3, 4 is in the dismounted position, the extendable roof rack arrangement 10 can easily be removed from the vehicle 1 with normal effort. In general terms, an embodiment of the present invention relates to an extendable vehicle rack arrangement comprising a first and a second load carrier foot 3, 4 and comprising a stationary part attached to said first and second load carrier foot 3, 4 and a displaceable part. The stationary part is pivotally connected to at least one of the load carrier feet 3, 4.

Figure 2:
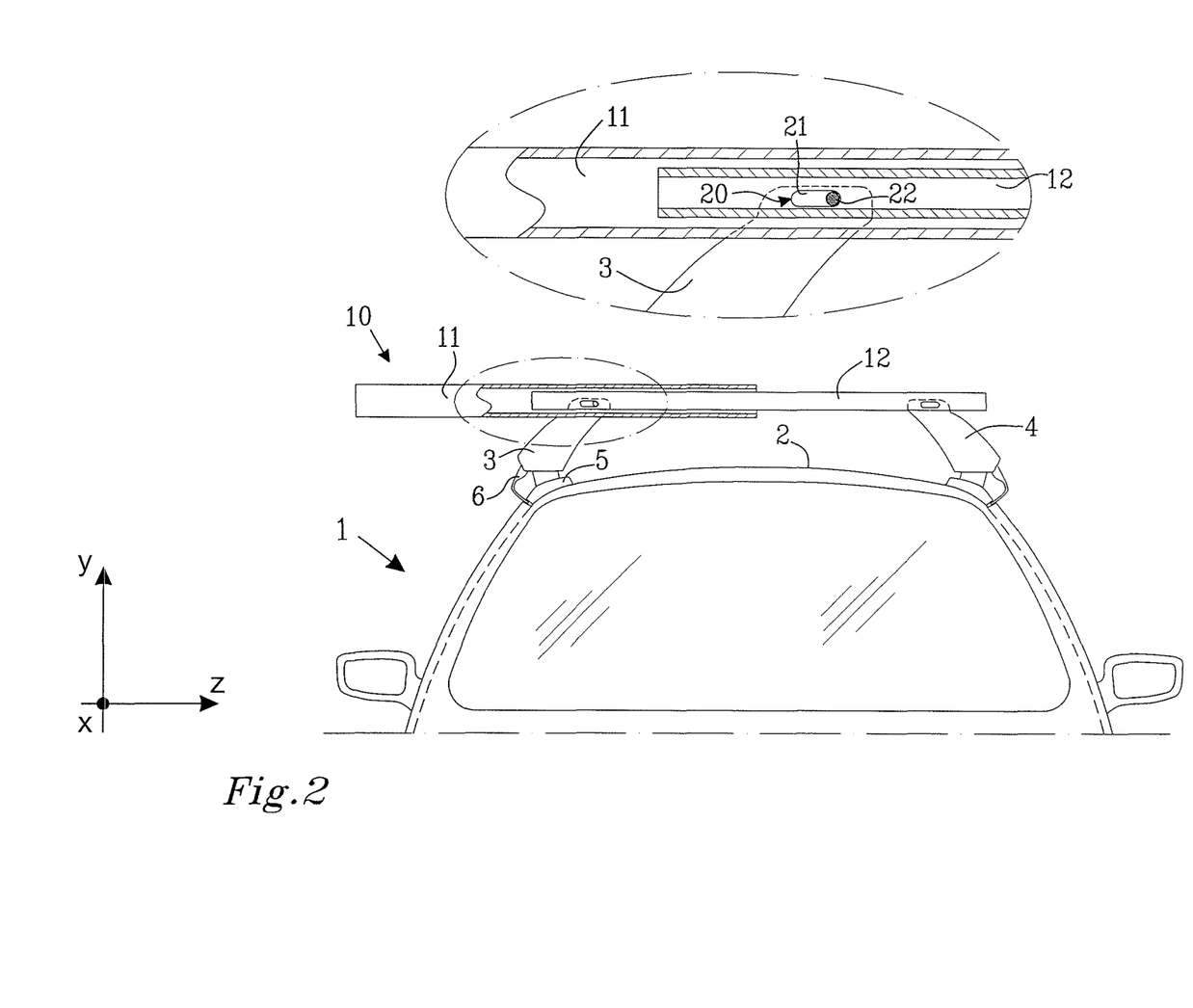
FIG. 2 shows an extendable vehicle rack arrangements from FIG. 1 seen from the front of the vehicle.

FIG. 2 shows a schematic view of the vehicle 1 as seen towards the front of the vehicle. FIG. 2 also shows an embodiment of the present invention in which the extendable roof rack arrangement 10 comprises a displaceable load carrying bar 11. A second bar 12 is attached to the first and the second load carrier foot 3, 4 and extends at least there between. The first load carrier foot 3 is pivotally attached to the second bar 12, as is shown in greater detail in FIG. 2. The displaceable load carrier bar 11 is configured to be displaced, in this embodiment to slide along the length of the second bar 12, between a retracted position and a displaced position. It should be noted that the displaceable load carrier bar 11 could, in another embodiment, be folded out, or folded down, to a displaced position.

By pivotally connecting the first load carrier foot 3 to the second bar 12, the intrinsic forces between the first and the second load carrier foot 3, 4, which could arise from force components acting to rotate first and the second the load carrier foot, 3, 4, irregular placed cargo or misaligned load carrier feet providing different attachment forces between the load carrier feet 3, 4, can effectively be neutralized or reduced. By reducing or neutralizing such forces, the displaceable load carrying bar 11 can easily be displaced with respect to the second bar 12 without interfering intrinsic forces. Such intrinsic forces could clamp or hinder displacement of a displaceable part.

According to an embodiment of the present invention, both the first and the second load carrier foot 3, 4 can be pivotally attached to the second bar 12. This enables an even better force reduction and/or force neutralization.

As is illustrated in FIG. 2, the second bar 12 is pivotally attached to the first load carrier foot 3 by means of a compensation joint 20. In this embodiment, the compensation joint 20 comprises an aperture 21 and a pin 22, which are adapted to compensate for the intrinsic forces between the first and second load carrier foot 3, 4 if present. The aperture 21 comprises a longitudinal extension, i.e. an extension parallel with the longitudinal direction of the displaceable load carrying bar 11, so as to compensate for both a pivotal displacement of the first load carrier foot 3 with respect to the second bar 12 and a longitudinal displacement, with respect to the second bar 12. The aperture 21 can however be circular or oval or the like, as long as the above mentioned function is present.

In the shown embodiment in FIG. 2, the aperture 21 is arranged on the load carrier foot 3 and the pin 22 is arranged on the second bar 12. In an alternative embodiment, the load carrier foot 3 could comprise a through going pin, or two protruding pins on each side, and the second bar 12 could comprise the aperture.

Alternatively, or optionally, the compensation joint 20 could comprise a flexible member, such as a rubber member, which attaches the second bar 12 to the first load carrier foot 3. Such rubber member could also compensate for intrinsic forces as mentioned above. The aperture 21 could thus be formed in the rubber member and the pin 22 extend through the rubber member, permitting both a pivotally displacement and a longitudinal displacement.

The compensation joint 20 is advantageously adapted to prevent the second bar 12 from displacement in a direction perpendicular to the longitudinal direction of the second bar 12, i.e. in a vertical direction indicated in FIG. 2 as the Y-dimension, while permitting the second bar 12 to be displaced in the longitudinal direction of the second bar 12 thereby eliminate or reduce intrinsic forces.

Figure 3:
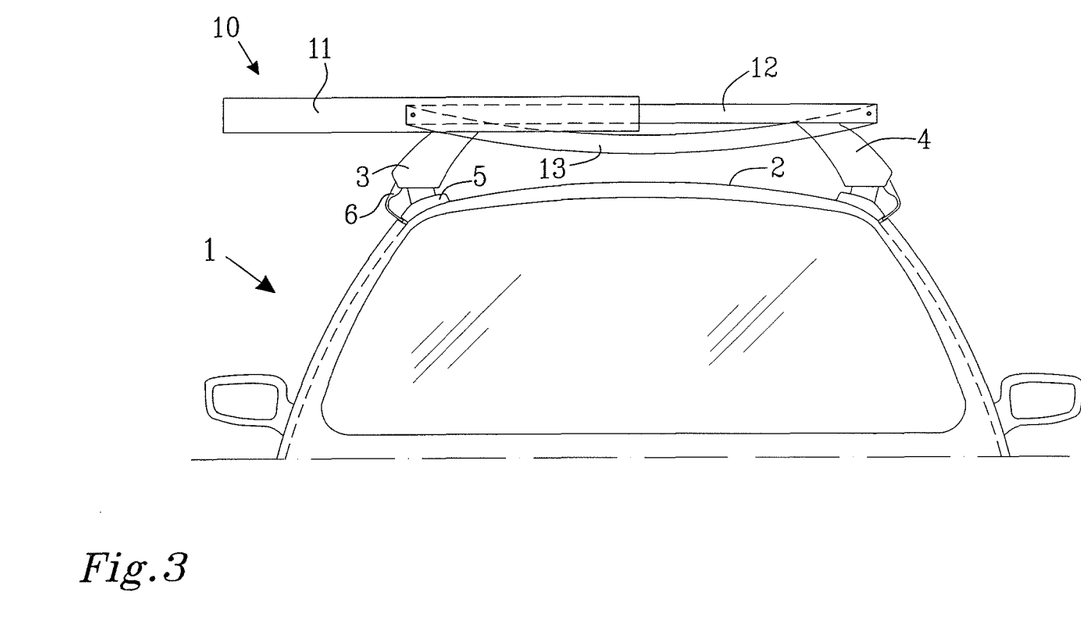
FIG. 3 shows an embodiment of the extendable vehicle rack arrangement as seen from the front of the vehicle.

In cases where the load carrier feet 3, 4 is of the type using a clamping force imparted between a support surface and a gripping member as primary attachment force, the extendable roof rack arrangement 10 advantageously comprises a support bar 13, i.e. a third bar, as shown in FIG. 3. In this embodiment, the support bar 13 is fixedly attached to the first and the second load carrier foot 3, 4, at least when the first and the second load carrier foot 3, 4 is in the mounted position.

The second bar 12 is pivotally arranged to the support bar 13 in the proximity of at least the first load carrier foot 3, but preferably in the proximity of the first and the second load carrier foot 3, 4.

FIG. 3 shows a schematic view of the extendable roof rack arrangement 10 after assembly with the vehicle 1. The first and the second load carrier foot 3, 4 are thus in their mounted positions. As the first and the second load carrier feet 3, 4 are of the clamping type, as described above, the first and the second load carrier foot 3, 4 each comprises a support surface 5 and a grip member 6. The support surface 5 comprises a rubber material so as to provide for a friction and shock absorbing material towards the vehicle 1. During attachment to the roof 2 of vehicle 1, the load carrier foot 3 rests on the support surface 5 whereafter the grip member 6 is forced in an upwardly and inwardly direction, as indicated by the arrow in FIG. 3, by a user when mounting the extendable roof rack arrangement 10 using the attachment means, such as a screw or buckle. The attachment means imparts a clamping force between the support surface 5 and the gripping member 6 which retains the load carrier foot 3 to the roof 2 of the vehicle 1.

In the shown embodiment, the second bar 12 is pivotally arranged to the support bar 13 in the proximity of the first and the second load carrier foot 3, 4. At least at the first load carrier foot 3, the second bar 12 is adapted to be displaced in the longitudinal direction of the second bar 12 with respect to the load carrier foot 3. This removes the intrinsic forces imparted by the tilted load carrier feet 3, 4 from the displaceable load carrying bar 11, and thus enables the displaceable load carrying bar 11 to slide on the second bar 12 without being subjected to the intrinsic forces. Such intrinsic forces could be bend forces subjected to the support bar 13, if present. Some of the intrinsic forces imparted due to the attachment of the load carrier feet 3, 4 are in this case absorbed by the support bar 13, which tend to adopt an arc shaped form. Such arc shaped form would severely reduce the ability to displace the displaceable load carrying bar 11 if not compensated by the pivotally attachment of the second bar 12 to the first and/or second load carrier foot 3, 4.

Generally, the extendable roof rack arrangement can thus comprise sliding improvement means to minimize the friction between the first displaceable load carrying bar and the second bar. At least the second bar 12 can in an embodiment be arranged with sliding improvement means, optionally, both the second and the forth bar 14 can be arranged with sliding improvement means. The sliding improvement means can be means such as ball bearings, low friction coatings, low friction materials, rollers, combinations thereof, or the like.

Figure 4:
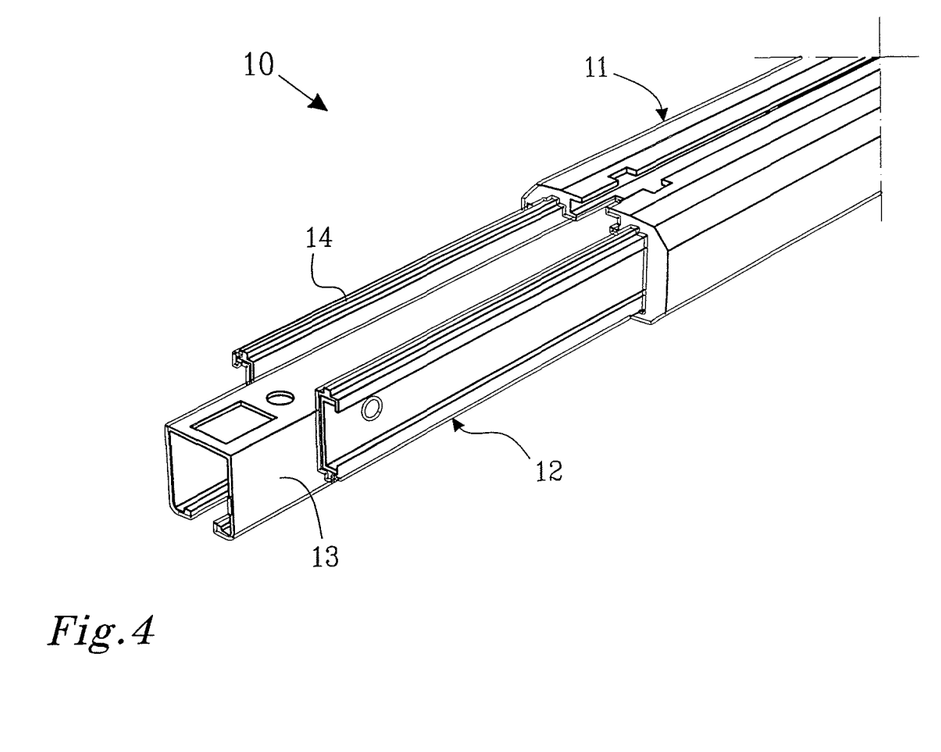
FIG. 4 shows the displaceable load carrying bar and the bar arrangement for attachment with the load carrier feet.

FIG. 4 shows parts of the extendable roof rack arrangement 10. More specifically, FIG. 4 shows the displaceable load carrier bar 11 in its displaced position. The second bar 12 and the support bar 13 are arranged as described above. A forth bar 14 is arranged to the support bar 13 in the same manner as the second bar 12. By using two bars 12, 14 arranged on either side to the support bar 13 and by having both pivotally connected to the support bar 13, the displaceable load carrier bar 11 can slide steadily along the second and forth bar 12, 14. Cross directional forces to the longitudinal direction of the displaceable load carrier bar 11 imparted to the displaceable load carrier bar 11 are effectively absorbed in this embodiment.

Figure 5:
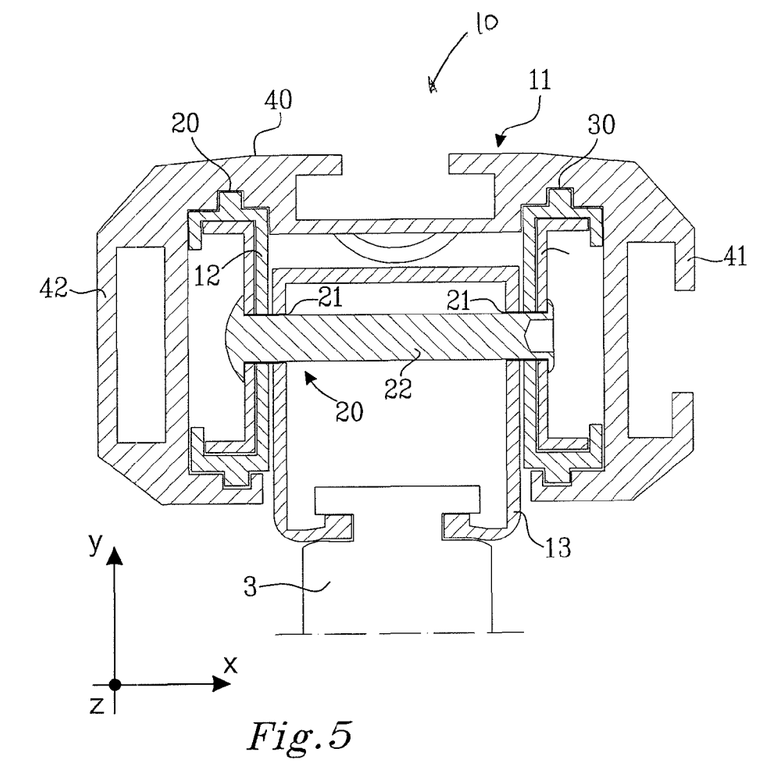
FIG. 5 a cross section of parts of the bar arrangement and the connection to one of the load carrier feet.

FIG. 5 shows a cross section of the extendable roof rack arrangement 10 at the compensation joint 20 of the load carrier foot 3. FIG. 5 shows the displaceable load carrier bar 11, the support bar 13 and arranged on either side, the second and forth bar 12, 14. Each of the second and forth bar 12, 14 comprises a sliding surface 30, i.e. a low friction surface. The sliding surface 30 comprises of a coating, or a sliding material layer, adapted to provide a reduced friction between at least the displaceable load carrier bar 11 and the second and forth bar 14. It should be noted however, that the second bar 12 and a support bar 13 can be arranged side by side, if no forth bar is present.

As is noticed, both the second and the forth bar 12, 14 are pivotally attached indirectly to the first load carrier foot 3 by means of a compensation joint 20. In this embodiment, the compensation joint 20 comprises two apertures 21 and a pin 22, which are adapted to compensate for the intrinsic forces between the first and second load carrier feet 3, 4 if present. The support bar 13 can thus bend to absorb forces without affecting the sliding ability of the displaceable load carrier bar 11, which slides on the second and forth bar 12, 14.

The displaceable load carrying bar 11 comprises a substantially C-shaped cross section. This enables the second bar, the support bar 13, and the forth bar 14, to be substantially encompassed by the displaceable load carrier bar, cross section wise, as seen in FIG. 5. The displaceable load carrier bar 11 comprises at least one C-shaped groove to accommodate attachment means for a load stop, cargo carrier device, such as a roof box, or any other sport or load utility. As shown in FIG. 5, the displaceable load carrier bar 11 comprises a load receiving surface 40 adapted to receive a load for transportation. For example, a C-shaped groove is advantageously arranged on the load receiving surface 40 of the displaceable load carrier bar 11. Optionally or additionally, a C-shaped groove can be arranged on the rearward side 41 or the forward side 42 of the displaceable load carrying bar 11, the forward side 42 being the side which is intended to be positioned in the forward direction of the vehicle. Optionally all or none of the load receiving surface 40 or the rearward or forward side 41, 42 comprise a C-shaped groove.

As mentioned above, in an embodiment of the present invention, the displaceable load carrying bar 11 comprises a substantially C-shaped cross section. As such at least the second bar 12 can be substantially encompassed by the displaceable load carrying bar 11, and the connection to the load carrier foot 2, 4. This enables the displaceable load carrying bar 11 to be displaced along the second bar 12 in both a first and a second longitudinal direction, as is indicated in with the dotted arrow in FIG. 3 for example. According to an aspect of the present invention, the displaceable load carrying bar 11 can be adapted to be displaced in a first and a second longitudinal direction with respect to the retracted position. This enables a user to, independently of which side of the vehicle he intends to load a cargo onto the first load carrying surface 40, can displace the displaceable load carrier bar 11 to an extended position to load a cargo.

FIGS. 3 and 5 further defines the X, Y and Z dimensions used herein. The X dimension being equivalent with the width of the displaceable load carrying bar 11, i.e. the forward and rearward direction of the vehicle after the extendable roof rack arrangement 10 has been assembled thereto; the Z dimension being equivalent with the longitudinal direction of the displaceable load carrier bar 11, the second bar 12, the support bar 13 and the forth bar 14; the Y dimension being equivalent with the height, or the vertical direction of said bars 11, 12, 13, 14. The Z-X dimensions form a horizontal plane.

The second and forth bar 12, 14 comprises an extension in the longitudinal direction, the Z-dimension, somewhat shorter than the support bar 13. The displaceable load carrier bar 11 comprises an extension in the longitudinal direction, the Z-dimension, of substantially the same length as the support bar 13. This enables a displacement locking system to be arranged at each end of the extendable roof rack arrangement 10.

In an embodiment, the second and forth bars 12, 14 comprises an extension of less than half the width of the support bar 13, as shown in FIG. 5 for example. However, the second bar, the support bar 13 and the forth bar 14 can comprise a substantially equal width.

In an alternative embodiment the second and forth bar 12, 14 are replaced by one bar. Such one bar can be e.g. formed from a unitary piece of material or being formed by interconnecting the second and the forth bar 12, 14 at appropriate place or places.

The vehicle could be a land vehicle such as lorry, a van, a car or a trailer, a sea vehicle such as a cargo boat, sailing boat or motor boat, an air vehicle, such as an airplane or helicopter, or the like. Land vehicles are however preferred vehicles.

Figure 6:
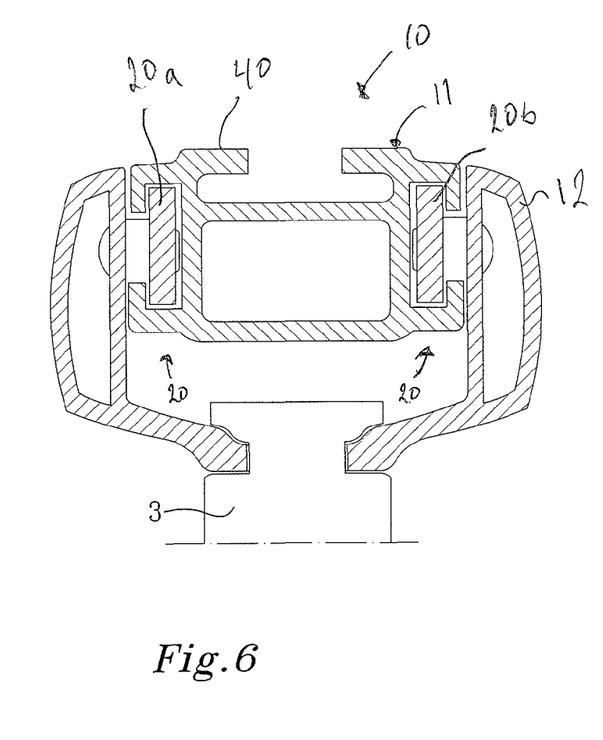
FIG. 6 a cross section of parts of the bar arrangement and the connection to one of the load carrier feet.

FIG. 6 shows a cross section of the extendable roof rack arrangement 10 at the compensation joint 20 of the load carrier foot 3. FIG. 6 shows the displaceable load carrier bar 11 and a second bar 12. As is noticed, the displaceable load carrying bar is pivotally connected indirectly to the first load carrier foot 3 by means of a compensation joint 20 to the second bar 12. In this embodiment, the compensation joint 20 comprises a first and a second wheel member 20a, 20b, which are adapted to compensate for the intrinsic forces between the first and second load carrier feet 3, 4 if present. The second bar 12 can thus bend to absorb forces without affecting the sliding ability of the displaceable load carrying bar 11, which can slide on the first and the second wheel member 20a, 20b.

The displaceable load carrying bar 11 comprises a substantially rectangular cross section. The second bar 12 is substantially encompassing the displaceable load carrying bar 11, cross section wise, as seen in FIG. 6. Only the load carrying surface is exposed. The displaceable load carrying bar 11 comprises at least one C-shaped groove to accommodate attachment means for a load stop, cargo carrier device, such as a roof box, or any other sport or load utility. As shown in FIG. 6, the displaceable load carrying bar 11 comprises a load receiving surface 40 adapted to receive a load for transportation. For example, a C-shaped groove is advantageously arranged on the load receiving surface 40 of the displaceable load carrying bar 11.

What is claimed is:

1. An extendable vehicle rack arrangement adapted to carry a cargo on a vehicle, said extendable vehicle rack arrangement comprising:
    a displaceable load-carrying bar comprising a first load-carrying surface;
    a second bar arranged in working cooperation with said displaceable load-carrying bar;
    a first load-carrier foot and a second load-carrier foot arranged in working cooperation with said second bar and couplable to a surface of said vehicle;
    said displaceable load-carrying bar being displaceable with respect to said second bar so as to provide for an extended load-carrying surface in a displaced configuration; and
    said second bar is pivotally coupled at a first joint, wherein substantially all of said first joint is located within said second bar, to said first load-carrier foot and pivotally coupled at a second joint to said second load carrier foot wherein said first and second carrier foot are located at the second bar, thereby enabling relative longitudinal displacement of at least said first load-carrier foot with respect to said second bar.

2. The extendable vehicle rack arrangement according to claim 1, wherein said second bar is further pivotally coupled to said second load-carrier foot enabling relative displacement of said second load-carrier foot with respect to said second bar.

3. The extendable vehicle rack arrangement according to claim 2, wherein said second bar has a longitudinal axis and said first load-carrier foot is relatively displaceable in a direction along said first longitudinal axis.

4. The extendable vehicle rack arrangement according to claim 1, wherein said second bar has a longitudinal axis and said first load-carrier foot is relatively displaceable in a direction along said first longitudinal axis.

5. The extendable vehicle rack arrangement according to claim 1, wherein said extendable vehicle rack arrangement comprises at least one support bar extending between said first and second load-carrier foot.

6. The extendable vehicle rack arrangement according to claim 5, wherein said at least one support bar is substantially fixedly attached to said first load-carrier foot and to said second load-carrier foot.

7. The extendable vehicle rack arrangement according to claim 6, wherein said second bar is pivotally coupled to said at least one support bar enabling relative displacement of at least said first load-carrier foot with respect to said second bar.

8. The extendable vehicle rack arrangement according to claim 7, wherein said second bar is pivotally coupled to one of: said first load-carrier foot; and said first load-carrier foot and second load-carrier foot,
    enabling relative displacement of at least said first load-carrier foot with respect to said second bar.

9. The extendable vehicle rack arrangement according to claim 1, wherein said extendable roof rack arrangement comprises an additional bar extending substantially parallel with said second bar.

10. The extendable vehicle rack arrangement according to claim 9, wherein said at least one support bar is arranged between said second and said additional bar.

11. The extendable vehicle rack arrangement according to claim 10, wherein said second bar and said additional bar are pivotally coupled to said at least one support bar.

12. The extendable vehicle rack arrangement according to claim 1, wherein said first load-carrier foot comprises a support surface and a gripping member.

13. The extendable vehicle rack arrangement according to claim 1, wherein said second load-carrier foot comprises a support surface and a gripping member.

14. The extendable vehicle rack arrangement according to claim 1, wherein said surface of said vehicle is a roof and said extendable vehicle rack arrangement is an extendable roof rack arrangement.

15. An extendable load-carrying bar arrangement for an extendable vehicle rack arrangement comprising:
    a first displaceable load-carrying bar comprising a first load-carrying surface;
    at least one second bar arranged in working cooperation with said displaceable load-carrying bar, said displaceable load-carrying bar being displaceable with respect to said second bar, thereby providing an extended load-carrying surface when displaced,
    wherein said load-carrying bar arrangement comprises means for coupling a first load-carrier foot at a first joint, wherein substantially all of said first joint is within said second bar, and for coupling a second load-carrier foot at a second joint within said second bar, said first load-carrier foot and said second load-carrier foot being operable between a dismounted configuration and a mounted configuration, said first carrier foot and said second carrier foot are located at the second bar, said first joint is configured to couple to said first load-carrier foot by means of a pivot coupling enabling relative longitudinal displacement in said mounted position of said first load-carrier foot with respect to said second bar, and said second joint is configured to couple to said second load-carrier foot by means of a pivot coupling enabling relative longitudinal displacement in said mounted position of said second load-carrier foot with respect to said second bar.

16. The extendable load-carrying bar arrangement according to claim 15, wherein said extendable load-carrying bar arrangement comprises an additional bar extending substantially parallel with said second bar.

17. The extendable load-carrying bar arrangement according to claim 16, wherein at least one support bar is interposed between said second bar and said additional bar.

18. A load-carrier foot for an extendable vehicle rack arrangement, said load-carrier foot removably couplable to a surface of a vehicle the load-carrier foot comprising:

a joint configured to receive and connect a first bar of an extendable load-carrying bar arrangement at a second bar, wherein said first bar is displaceable with respect to said second bar;

said load-carrier foot being operable between a dismounted configuration and a mounted configuration;

said joint, wherein substantially all of said join is within said second bar, configured to connect second bar to said load-carrier foot by means of a pivot connection enabling relative longitudinal displacement of said load-carrier foot with respect to said second bar attached transversely to the surface of said vehicle via said load-carrier foot when said load-carrier foot is in said mounted position.

19. The load-carrier foot according to claim 18, wherein said load-carrier foot is a clamping load-carrier foot having a support surface and a gripping member.

\* \* \* \* \*